United States Patent
Asinovski et al.

(10) Patent No.: US 9,484,801 B2
(45) Date of Patent: Nov. 1, 2016

(54) START-UP REGULATOR FOR HIGH-INPUT-VOLTAGE POWER CONVERTERS

(71) Applicant: Murata Manufacturing Co., Ltd., Nagaokakyo-shi, Kyoto-fu (JP)

(72) Inventors: Alexander Asinovski, Stoughton, MA (US); Joseph Gonsalves, Warren, RI (US); Conor Rochford, Providence, RI (US)

(73) Assignee: Murata Manufacturing Co., Ltd., Kyoto (JP)

(*) Notice: Subject to any disclaimer, the term of this patent is extended or adjusted under 35 U.S.C. 154(b) by 0 days.

(21) Appl. No.: 14/608,938

(22) Filed: Jan. 29, 2015

(65) Prior Publication Data

US 2015/0222176 A1   Aug. 6, 2015

Related U.S. Application Data

(60) Provisional application No. 61/934,140, filed on Jan. 31, 2014.

(51) Int. Cl.
  *H02M 1/36* (2007.01)
  *H02M 3/337* (2006.01)

(52) U.S. Cl.
  CPC .............. *H02M 1/36* (2013.01); *H02M 3/337* (2013.01)

(58) Field of Classification Search
  CPC ......... H02M 1/08; H02M 1/36; H02M 3/335
  USPC ....................... 363/17, 49, 98, 132
  See application file for complete search history.

(56) References Cited

U.S. PATENT DOCUMENTS

| 8,427,849 B2 | 4/2013 | Asinovski et al. |
| 2010/0290257 A1* | 11/2010 | Asinovski ............... H02M 1/36 363/49 |
| 2015/0222176 A1* | 8/2015 | Asinovski ............. H02M 3/337 323/271 |

FOREIGN PATENT DOCUMENTS

JP   2001-309653 A   11/2001

OTHER PUBLICATIONS

Texas Instruments, "Voltage Mode Active Clamp Controller", LM5027, Nov. 2009, 34 pages.
Maxim, "Current-Mode PWM Controllers with Programmable Switching Frequency", Max15000/MAX15001, Jan. 2006, pp. 1-18.

* cited by examiner

*Primary Examiner* — Jeffrey Sterrett
(74) *Attorney, Agent, or Firm* — Keating & Bennett, LLP

(57) ABSTRACT

A power converter system includes first and second input terminals; a converter connected to the first and second input terminals and including an output terminal; a start-up circuit connected to a first capacitor and configured to charge the first capacitor during start-up and hiccup conditions; a voltage source connected to the first and second input terminals and configured to provide, during the start-up and hiccup conditions, a voltage proportional to a voltage applied to the first and second input terminals; and a voltage buffer including a MOSFET with a gate connected to the voltage source, a source connected to the start-up circuit, and a drain connected to one of the first and second input terminals.

13 Claims, 4 Drawing Sheets

START-UP REGULATOR FOR HIGH-INPUT-VOLTAGE POWER CONVERTERS

BACKGROUND OF THE INVENTION

1. Field of the Invention

The present invention relates to power converters. More specifically, the present invention relates to start-up circuits that provide a start-up voltage to a control system of a power converter during a power-up process when an output voltage rises from zero to a nominal level.

2. Description of the Related Art

Conventional IC controllers used in switching power converters have embedded, internal start-up circuits that provide power to the control system of the power converter during startup. An example IC controller is the LM50XX series from Texas Instruments, Inc. (TI). A simplified block diagram of a start-up circuit 100 for a converter 105, which includes an IC controller 101, is shown in FIG. 1. The start-up circuit 100 includes the IC controller 101, and the IC controller 101 includes an internal start-up circuit (not explicitly shown in FIG. 1) that includes the input pin Vin that is typically connected to the terminal Vin+. The IC controller 101 includes an under-voltage-lockout (UVLO) feature. If the input voltage Vinput is below the UVLO voltage, the IC controller is turned off, and if the input voltage Vinput is above the UVLO voltage, the IC controller is turned on. The UVLO voltage is right below the minimum operating voltage of the IC controller 101 at which the IC controller provides an output. When the input voltage Vinput across the terminals Vin+, Vin− of the start-up circuit 100 in FIG. 1 is greater than the minimum operating voltage of the IC controller 101 at the input pin Vin, the output voltage Vcc of the IC controller 101 is enabled to charge an external capacitor 102 connected to the power-supply pin Vcc. The external capacitor 102 is an energy-storage capacitor that provides the initial start-up energy for the power converter 105. A controller output 103 that controls the power transistors of the converter 105 is enabled when the voltage at the power-supply pin Vcc reaches the regulation point (i.e., when the voltage reaches a voltage at which the converter 105 can provide regulation), which is typically 10 V. In a typical application, an auxiliary output 107 of the converter 105 is connected to the power-supply pin Vcc through a diode 104, which is reverse biased with the power-supply pin Vcc during startup.

When the output voltage of the converter 105 of the load terminal 106 reaches its nominal level, the auxiliary output 107 also reaches its nominal level, typically 12V, causing the diode 104 to become forward biased, which shuts off the internal start-up circuit of the IC controller 101. Accordingly, the internal start-up circuit of the IC controller 101 only operates during relatively short times such as during startup and hiccup conditions. Hiccup conditions can be caused by, for example, over-load, over-voltage, and over-temperature conditions. Therefore, steady-state power dissipation in the internal start-up circuit of the IC controller is eliminated. Powering the IC controller 101 from the auxiliary output 107 of the converter 105 through the diode 104 eliminates the internal start-up circuit losses during steady state conditions, reducing overall controller power consumption and improving overall efficiency.

Power consumption P of the start-up circuit 100 during the hiccup condition ON time Ton and with period T, which is the total time between hiccup conditions, can be calculated according to the formula:

$$P = V_{in} * I_{reg} * T_{on}/T,  \quad (1)$$

where Vin is the input voltage across the terminals Vin+, Vin− and Ireg is the start-up regulator current. Even though power consumption P according to formula (1) increases with the input voltage Vinput, it is relatively low because of the low hiccup-condition duty cycle D=Ton/T, which is typically 5%. For example, in the worst-case, power consumption P for the start-up circuit 100 with Ireg=20 mA=0.02 A, at high input voltage Vinput=75 V under hiccup condition with hiccup-condition duty cycle D=Ton/T=0.05 (i.e., 5% hiccup-condition duty cycle) according to formula (1) is: P=75 V*0.02 A*0.05=0.075 W=75 mW.

The above-described internal start-up circuit of the IC controller 101 is efficient in a specified input voltage range, for example, 14 V to 100 V. However, when the maximum input voltage of the converter 105 is greater than the maximum allowable input voltage of the IC controller 101 (typically 100 V at the input pin Vin), the internal start-up circuit of the IC controller 101 cannot be connected to the terminal Vin+. Accordingly, it is recommended (see, for example, the datasheet for the LM5027 controller from TI) to disable the internal start-up circuit of the IC controller 101 by disconnecting the input pin Vin from the terminal Vin+ and providing, as illustrated in FIG. 2, an external high-voltage start-up circuit 208 to provide the power-supply voltage Vcc.

The other parts and basic operation of the circuit 200 in FIG. 2 are the same or substantially the same as in the circuit 100 in FIG. 1. The IC controller 201 is enabled to charge an external capacitor 202 connected to the power-supply pin Vcc. The converter 205 includes auxiliary output 207 and load terminal 206. The converter 205 is controlled by the controller output 203. The auxiliary output 207 of the converter 205 is connected diode 204.

Because the internal start-up circuit of the IC controller 201 is disabled in high-input-voltage applications according to FIG. 2, an IC controller 201 without an internal start-up circuit can also be used provided that the power-supply voltage Vcc is supplied by an external high-voltage start-up circuit 208.

An example of an efficient start-up circuit with no losses at steady state that can be used as an external start-up circuit 208 in FIG. 2 is disclosed in U.S. Pat. No. 8,427,849. The external start-up circuit of U.S. Pat. No. 8,427,849 is shown in FIG. 3 as start-up circuit 300 The external start-up circuit 300 is connected to the power converter 307 and IC controller 308. The power converter 307 includes an auxiliary output terminal 309. The external start-up circuit 300 includes a start-up transistor 301, a first diode 302, a resistor 303, a Zener diode 304, a capacitor 305, a second diode 306, and a switch Q with a control circuit 310 that receives a control signal from the auxiliary output terminal 309 of the power converter 307.

The external start-up circuit 300 in FIG. 3 operates in the following manner. After the input voltage Vinput is applied across the terminals Vin+, Vin−, the Zener diode 304 is activated through the resistor 303 and the switch Q that is initially ON. The transistor 301 is a bipolar junction transistor (BJT) that supplies a start-up voltage to the power-supply pin Vcc of the IC controller 308 and across the capacitor 305 equal to the zener voltage Vz of the Zener diode 304 minus the combined voltage drop of the base-to-emitter voltage drop of the transistor 301 and the voltage drop across the first diode 302. The start-up voltage, applied to the power-supply pin Vcc of the IC controller 308, reverse biases the second diode 306 and enables the controller output 311, which initiates startup of the power converter 307. During start-up, the power converter 307 increases the output voltage on the LOAD and the auxiliary voltage on the auxiliary output 309 to their nominal levels. The start-up current for the control circuit 308 is supplied by the transistor 301. The transistor 301 is controlled independent of the input voltage Vinput by the fixed zener voltage Vz of the Zener diode 304, resulting in a fixed start-up time over the entire input voltage range.

When the auxiliary voltage at the auxiliary output terminal 309 reaches a predetermined voltage, the control circuit 310 switches switch Q OFF, causing the transistor 301 to also switch OFF. Once the transistor 301 switches OFF, the first diode 302 becomes reverse biased, the second diode 306 becomes forward biased, and the auxiliary power from the auxiliary output 309 supplies power to the power-supply pin Vcc of the controller 308. Accordingly, the supply voltage supplied to the power-supply pin Vcc of the controller 308 at start-up is determined by the zener voltage of the zener voltage Vz (typically 10 V) and at steady state is provided by the auxiliary voltage from the auxiliary output 309 (typically 12 V). The maximum-allowable high input voltage across the terminals Vin+, Vin− is limited by the transistor 301 and by the switch Q in contrast to the start-up circuit 100 in FIG. 1 that is limited by the internal start-up circuit of the controller 101. Power consumption in the start-up circuit 300 in FIG. 3 at steady state is eliminated because the resistor 303 is not conducting and transistor 301 is in the OFF state.

Power consumption P of the start-up circuit 300 in FIG. 3 under hiccup conditions can be calculated as $$P = V_{in} * I_{reg} * T_{on}/T + V_{in} * [(V_{in} - V_z)/R] * T_{on}/T, \quad (2)$$

where T and Ton, as in formula (1), are the period and the ON time of the hiccup condition, R is the resistance value of the resistor 303, and Vz is the zener voltage of the Zener diode 304. Equation (2) has the form P=A+B, where A is the same as formula (1) and B is a function of the input voltage Vinput. Assuming the same basic parameters as in the above example: Vin=75 V, Ton/T=0.05, and Ireg=20 mA, Vz=12 V, R=3 kΩ, equation (2) provides:

$$P = 75 \text{ V} * 0.02 \text{ A} * 0.05 + 75 \text{ V} * [(75 \text{ V} - 12 \text{ V})/3000 \text{ }\Omega] * 0.05 = 0.15 \text{ W} = 150 \text{ mW},$$

which is 2 times greater than the power consumption calculated above for the start-up circuit 100 in FIG. 1. Drawbacks of the external start-up circuit shown in FIGS. 2 and 3 are increased power consumption at high input voltages under hiccup conditions and increased physical size, complexity, and cost.

Thus, there is a need for a more efficient, less complex, and less expensive start-up circuit for high-input-voltage power converters that preferably uses the internal start up circuit of an IC controller.

SUMMARY OF THE INVENTION

To overcome the problems described above, preferred embodiments of the present invention provide a more efficient, less complex, and less costly start-up circuit for power converters with high input voltage.

According to a preferred embodiment of the present invention, a power converter system includes first and second input terminals; a converter connected to the first and second input terminals and including an output terminal; a start-up circuit connected to a first capacitor and configured to charge the first capacitor during start-up and hiccup conditions; a voltage source connected to the first and second input terminals and configured to provide, during the start-up and hiccup conditions, a voltage proportional to a voltage applied to the first and second input terminals; and a voltage buffer including a MOSFET with a gate connected to the voltage source, a source connected to the start-up circuit, and a drain connected to one of the first and second input terminals.

The voltage source preferably includes a high-impedance resistive divider. Preferably, the high-impedance resistive divider includes first and second resistors connected in series, where the first resistor is connected to the first input terminal and where the second resistor is connected to the second input terminal. Preferably, the high-impedance resistive divider further includes second and third capacitors, where the second capacitor is connected in parallel with the first resistor and where the third capacitor is connected in parallel with the second resistor.

Preferably, the converter includes a half-bridge circuit including at least two capacitors connected in series, and the voltage source includes the at least two capacitors. The power converter system further preferably includes a capacitor connected to the output of the voltage buffer.

The converter preferably includes an auxiliary output. The auxiliary output is preferably configured to charge the first capacitor during steady-state conditions.

The power converter system further preferably includes an IC controller configured to provide control signals to the converter after the first capacitor is charged to a predetermined voltage level. The IC controller preferably includes the start-up circuit. The IC controller preferably includes an input pin that is connected to the start-up circuit and a power-supply pin that is connected to the first capacitor. The start-up circuit preferably charges the first capacitor through the power-supply pin.

The voltage source preferably does not include a Zener diode or a reference voltage.

The above and other features, elements, characteristics, methods, steps and advantages of the present invention will become more apparent from the following detailed description of preferred embodiments of the present invention with reference to the attached drawings.

DETAILED DESCRIPTION OF PREFERRED EMBODIMENTS

Figure 4:
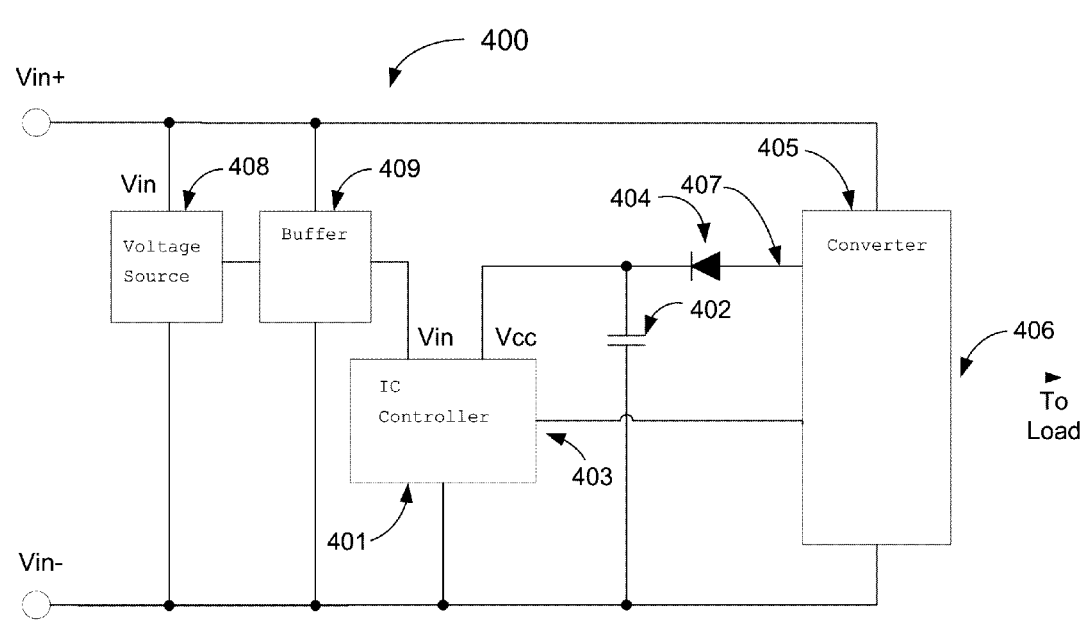
FIG. 4 shows a start-up circuit according to a first preferred embodiment of the present invention.

FIG. 4 shows a start-up circuit 400 according to the first preferred embodiment of the present invention that includes an IC controller 401 with an internal relatively low-voltage start-up circuit with an input pin Vin and a power-supply pin Vcc, a capacitor 402 connected to the power-supply pin Vcc, and a buffer 409 connected to the terminal Vin+, having its output connected to the input pin Vin of the IC controller 401 and controlled by a voltage source 408. The start-up circuit 400 is connected to the power converter 405 that includes a load output 406 and an auxiliary output 407.

The start-up circuit 400 in FIG. 4 operates in the following manner. After the input voltage Vinput is applied across terminals Vin+, Vin−, the voltage source 408 generates a voltage within the input voltage range specified for the input pin Vin of the IC controller 401. The voltage source 408 preferably generates a voltage that is proportional to the input voltage Vinput. The voltage source 408 preferably does not include a stable voltage source by including, for example, a Zener diode or a reference voltage. The voltage source 408 does not need to provide a stable voltage if the input pin Vin of the IC controller 401 can accept a wide range of voltages. It is preferable to provide the generated voltage at the input pin Vin, which can accept a wide range of voltages (e.g., up to about 100 V), instead of the power-supply pin Vcc, which can accept a narrow range of voltages (e.g., about 9-15 V). The generated voltage is supplied to the high-impedance input of the buffer 409. The output of the buffer 409 follows its input and is capable of supplying the necessary current (typically about 20 mA) to the input pin Vin of the IC controller 401. The controller output 403 is enabled when the capacitor 402 connected to the power-supply pin Vcc is charged to the regulation point, typically about 10V, for example. The auxiliary output 407 of the converter 405 is typically connected to the power-supply pin Vcc of the controller 401 through a diode 404 that is reverse biased during start-up by the output voltage of the internal start-up circuit at the power-supply pin Vcc.

Figure 1:
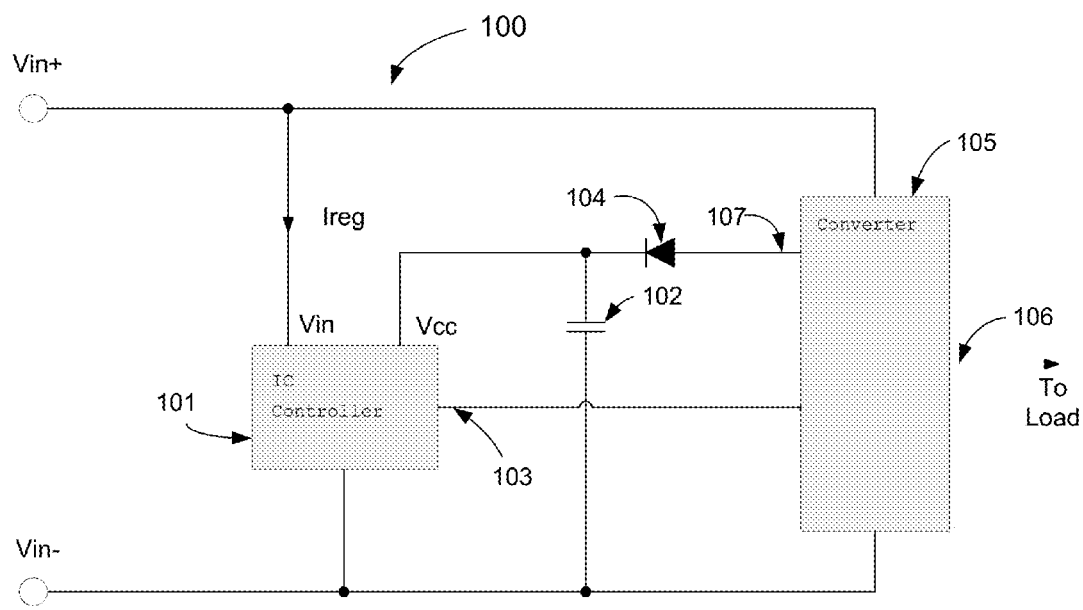
FIG. 1 shows a conventional start-up circuit including a relatively low voltage start-up regulator embedded in the IC controller.

When the output voltage of the converter 405 at the load terminal 406 reaches its nominal voltage, the auxiliary output 407 also reaches its nominal voltage, typically about 12V, for example, causing the diode 404 to become forward biased, which shuts off the internal start-up circuit of the controller 401. Accordingly, the internal start-up circuit and the buffer 409 only conduct current during relatively short times such as start-up and hiccup conditions. Hiccup conditions can be caused by, for example, over-load, over-voltage, and over-temperature conditions. At steady state, the internal start-up circuit of the controller 401 and the buffer 409 do not conduct and therefore do not consume power. The voltage source 408 dissipates negligible power under all conditions because of the high input impedance of the buffer 409. Similar to the start-up circuits 100, 200, 300 in FIG. 1, FIG. 2, and FIG. 3, powering the controller 401 from an auxiliary output 407 of the converter 405 through the diode 404 eliminates losses from the internal start-up circuit at steady state, reducing overall controller power dissipation and improving efficiency. Under hiccup conditions, power consumption of the start-up circuit 400 in FIG. 4 follows equation (1) for the start-up circuit 100 in FIG. 1 which has a lower power loss than equation (2) for the start-up circuit 200 in FIG. 2.

Figure 2:
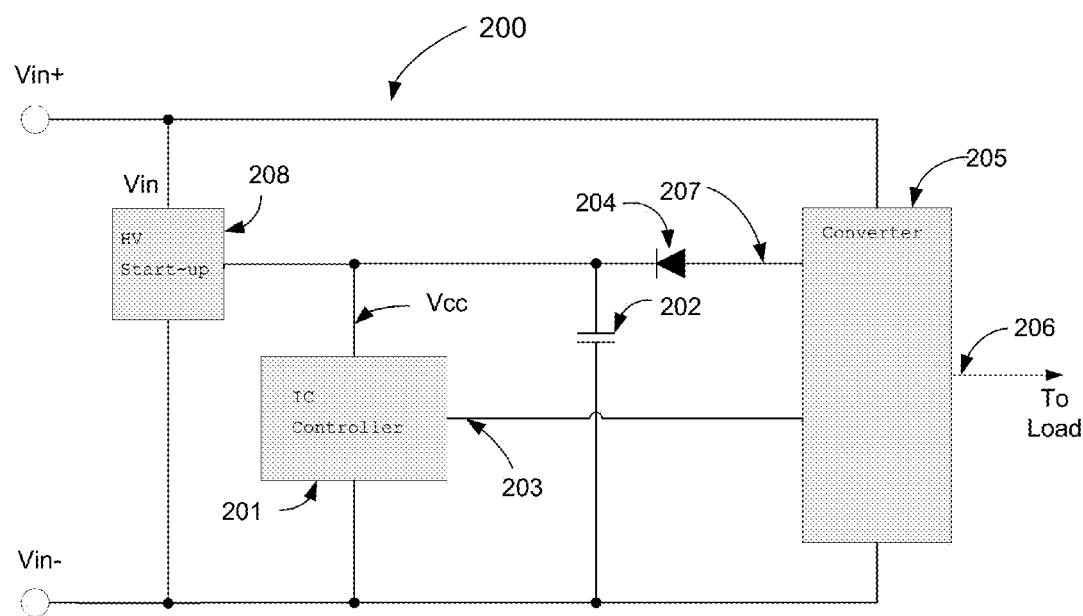
FIG. 2 shows a block diagram of a conventional start-up circuit including a high voltage start-up regulator external to the IC controller.
Figure 3:
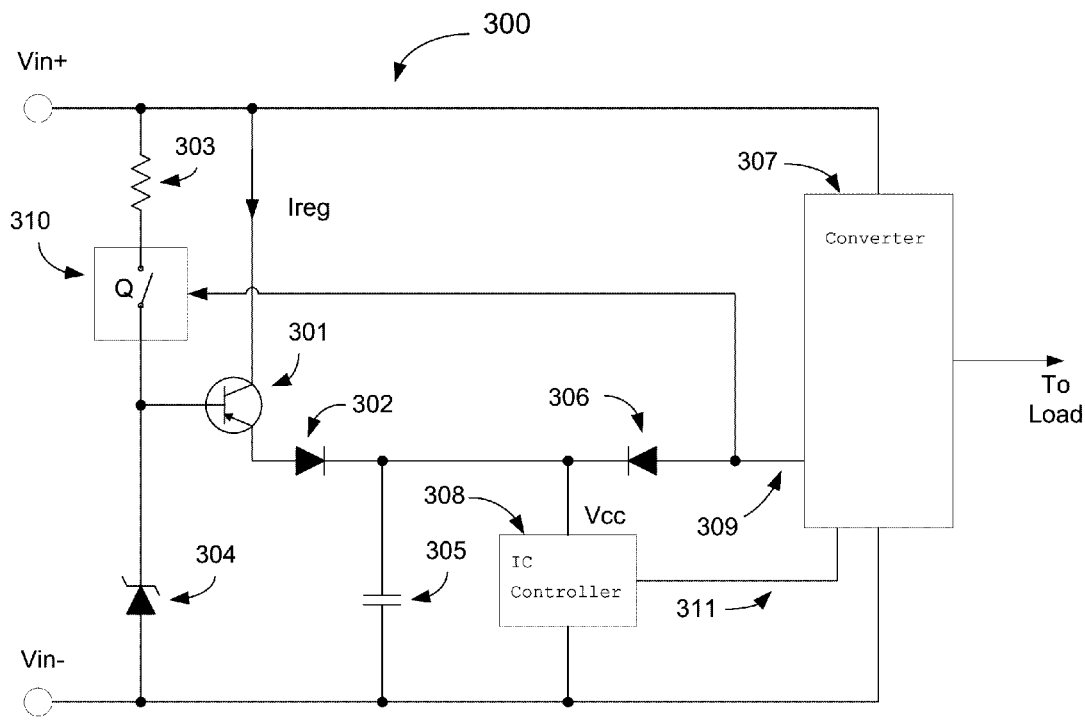
FIG. 3 shows a variant of a conventional start-up circuit including a high voltage start-up regulator external to the IC controller.

By replacing the external start-up circuits in FIG. 2 and FIG. 3 with a less complex, less dissipative, and less expensive circuit, the start-up circuit 400 in FIG. 4 does not create power losses at steady state, minimizes power losses under hiccup conditions, allows a larger input voltage range for the internal start-up circuit of the IC controller 401, and allows the IC controller's 401 features to be fully used. Thus, the start-up circuit 400 in FIG. 4 is suitable for power converters with high input voltages.

Figure 5:
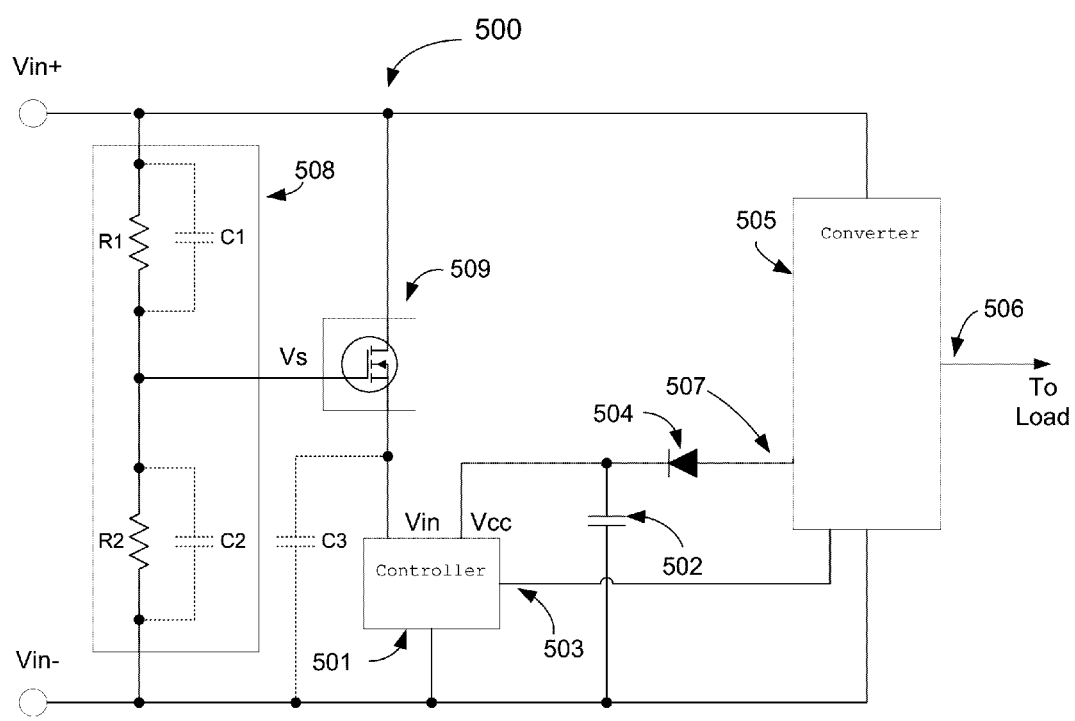
FIG. 5 shows a start-up circuit according to a second preferred embodiment of the present invention.

The voltage source 408 and the buffer 409 are preferably less complex, less dissipative, and less expensive compared to the external start-up circuit 208 in FIG. 2 or the external start-up circuit 300 in FIG. 3. In half-bridge topologies as shown, for example, in FIG. 6, the voltage source 408 already exists at the junction of the half bridge capacitors so that no additional components are needed. In other topologies, the voltage source 408 can include a voltage divider with only two resistors as shown in FIG. 5, which includes resistors R1, R2. The buffer 409 can include only a single MOSFET as with the buffer 509 shown in FIG. 5 and the buffer 609 shown in FIG. 6. In addition, a control circuit similar to the control circuit 310 in FIG. 3 is not needed.

FIG. 5 shows a start-up circuit 500 according to the second preferred embodiment of the present invention. The start-up circuit 500 in FIG. 5 is a variant of the start-up circuit 400 in FIG. 4. The buffer 509 includes an N-channel MOSFET, configured as a source follower, which is also known as a common-drain amplifier. A MOSFET is preferred to a BJT as used in the prior art because MOSFETs are voltage-controlled devices while BJTs are current-controlled devices. Voltage-controlled devices can require less current than current-controlled devices. The MOSFET in the buffer 509 has a drain connected to the terminal Vin+, has a source connected to the input pin Vin of the controller 501, and a gate controlled by a very-low-power voltage source 508. As shown in FIG. 5, the very-low-power voltage source 508 preferably includes a high-impedance resistive divider with resistors R1, R2.

The start-up circuit 500 in FIG. 5 operates similarly to the start-up circuit 400 in FIG. 4 in the following manner. After the input voltage Vinput is applied across the terminals Vin+, Vin−, the voltage source 508 generates a voltage Vs, where Vs=Vin*R2/(R1+R2), within the input voltage range specified for the input pin Vin of the IC controller 501 (typically below about 100 V, for example). The voltage Vs is provided to the gate of the MOSFET in the buffer 509. The voltage at the source of the MOSFET in the buffer 509 and at the input pin Vin of the IC controller 501 is equal to Vs minus the gate-to-source voltage of the MOSFET (typically, about 2-3 V, for example). During start-up, the current supplied by the input pin Vin, which is internally limited by the controller 501 to typically about 20 mA, for example, charges the capacitor 502 to the regulation point (typically about 10 V, for example), allowing the IC controller 501 to enable its output 503. In a typical application, an auxiliary output 507 of the converter 505 is connected to the power-supply pin Vcc of the controller 501 through a diode 504 which is reverse biased with the output voltage of the internal start-up circuit at the power-supply pin Vcc during start-up.

When the output voltage of the converter 505 at its load terminal 506 reaches its nominal voltage, the auxiliary output 507 also reaches its nominal voltage, typically about 12 V, for example, causing the diode 504 to become forward biased, which shuts off the internal start-up circuit of the IC controller 501. Accordingly, the internal start-up circuit and the buffer 509 only conduct current during relatively short times such as start-up and hiccup conditions. At steady state, the internal start-up circuit of the IC controller 501 and the buffer 509 do not conduct and therefore do not dissipate power. Because the MOSFET in the buffer 509 operates with practically no gate current, the resistances of the resistors R1 and R2 can be set high enough to ensure negligible current in the voltage source 508 with near-zero power dissipation. Similar to the start-up circuits 100, 200, 300, 400 in FIG. 1, FIG. 2, FIG. 3 and FIG. 4, powering the IC controller 501 from an auxiliary output 507 of the converter 505 through the diode 504 eliminates losses from the internal start-up circuit at steady state, reducing overall controller power dissipation and improving overall efficiency. Under hiccup conditions, power dissipation in the start-up circuit 500 in FIG. 5, like in the start-up circuit 400 in FIG. 4, follows equation (1) for the start-up circuit 100 in FIG. 1, which has a lower power loss than equation (2) for the conventional start-up circuits 200, 300 in FIGS. 2 and 3.

The voltage Vs across resistor R2 at high input voltage, e.g., at about 150 V across the terminals Vin+, Vin−, can be set at or below the maximum specified voltage for the input pin Vin of the IC controller 501 (typically about 100 V, for example).

Assuming that the IC controller 501 is specified to operate in an N:1 input voltage range (typically about 100 V to about 14 V at the input pin Vin with N=100/14≈7, for example), the start-up circuit 500 in FIG. 5 can operate in the same N:1 range with proportionally increased maximum (i.e., highest) and minimum (i.e., lowest) input voltages. For example, if N=7 with the 100 V maximum specified voltage at the input pin Vin of the IC controller 501 and with high input voltage across the terminals Vin+, Vin− of 150 V, then the maximum operating input voltage range of the start-up circuit 500 in FIG. 5 will be about 150 V (i.e., at the highest input voltage) to about 150/7≈21 V (i.e., at the lowest input voltage). To increase noise immunity and to improve start-up transients at the input pin Vin, a capacitor C3 can be disposed between the input pin Vin of the IC controller 501 and the terminal Vin− and capacitors C1, C2 can be disposed across the resistors R1, R2, respectively, as shown with dotted lines in FIG. 5, without changing basic operation of the start-up circuit 500.

Similar to the start-up circuit 400 in FIG. 4, by replacing the external start-up circuits in FIGS. 2 and 3 with a less complex, less dissipative, and less expensive circuit, the start-up circuit 500 in FIG. 5 does not create power losses at steady state, minimizes power losses under hiccup conditions, allows a larger input voltage range for the internal start-up circuit of the IC controller 501, and allows all of the features and characteristics of the IC controller 501 to be fully utilized. Thus, the start-up circuit 500 in FIG. 5 is suitable for power converters with high input voltage.

The voltage source 508 and the buffer 509 are preferably less complex, less dissipative, and less expensive compared to the external start-up circuit 208 in FIG. 2 or the external start-up circuit 300 in FIG. 3. The voltage source 508 can include a voltage divider with only two resistors as shown in FIG. 5 with resistors R1, R2, for example. The buffer 509 can include a single MOSFET, for example. In addition, a control circuit similar to control circuit 310 in FIG. 3 is not needed.

Figure 6:
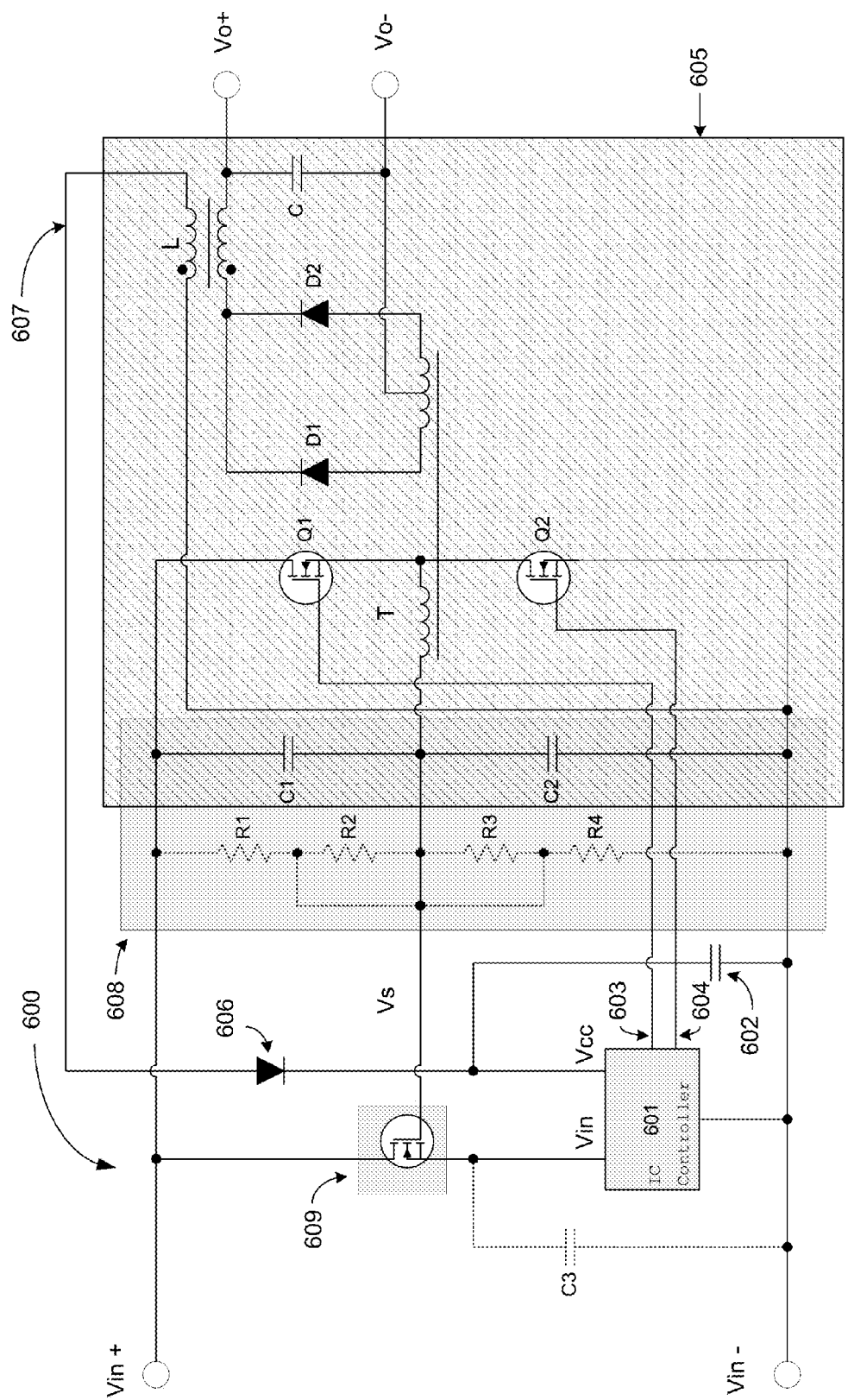
FIG. 6 shows a start-up circuit according to a third preferred embodiment of the present invention.

FIG. 6 shows a start-up circuit 600 according to the third preferred embodiment of the present invention. The start-up circuit 600 in FIG. 6 is another variant of the start-up circuit 400 in FIG. 4, where the buffer 409, similar to the buffer 509 in the start-up circuit 500 in FIG. 5, preferably includes an N-channel MOSFET configured as a source follower. The MOSFET in the buffer 609 has a drain connected to the terminal Vin+, has a source connected to the input pin Vin of the IC controller 601, and a gate controlled by a very-low-power voltage source 608. As shown in FIG. 6, the very-low-power voltage source 608 preferably includes a capacitive divider including capacitors C1, C2 of a half-bridge isolated converter 605. The converter 605 includes primary switches Q1, Q2, secondary rectifiers D1, D2, an isolated transformer T, an output inductor L, an output capacitor C, and output terminals Vo+, Vo−.

The start-up circuit 600 in FIG. 6 operates similarly to the start-up circuits 400, 500 in FIGS. 4 and 5 in the following manner. After the input voltage is applied across the terminals Vin+, Vin−, the voltage source 608 generates a voltage Vs, where Vs=Vin/2, within the input voltage range specified for the input pin Vin of the IC controller 601 (typically below about 100 V, for example). That voltage Vs is applied to the gate of the MOSFET in the buffer 609. The voltage at the source of the MOSFET in the buffer 609 and at the input pin Vin of the IC controller 601 is equal to Vs minus the gate-to-source voltage of the MOSFET (typically about 2-3 V, for example). During start-up, the current supplied by the input pin Vin, which is internally limited by the IC controller 601 to typically about 20 mA, charges the capacitor 602 to the regulation point (typically about 10V, for example) allowing the IC controller 601 to enable its outputs 603, 604. In a typical application, an auxiliary output 607 of the converter 605 is connected to the power-supply pin Vcc of the IC controller 601 through a diode 606 which is reverse biased during the start-up by the output voltage of the internal start-up circuit at the power-supply pin Vcc.

When the output voltage of the converter 601 across its load terminals Vo+, Vo− reaches its nominal voltage, the auxiliary output 607 also reaches its nominal voltage, typically about 12V, causing the diode 606 to become forward biased, which shuts off the internal start-up circuit of the IC controller 601. Accordingly, the internal start-up circuit and the buffer 609 only conduct current during relatively short time such as start-up and hiccup conditions. At steady state, the internal start-up circuit of the controller 601 and the buffer 609 do not conduct current and therefore do not dissipate power. The voltage source 608 dissipates negligible power under all conditions because voltage Vs is provided by the capacitive divider including capacitors C1, C2. Similarly to the start-up circuits 100, 200, 300, 400, 500 in FIG. 1, FIG. 2, FIG. 3, FIG. 4 and FIG. 5, powering the IC controller 601 from an auxiliary output 607 of the converter 605 through the diode 606 eliminates start-up regulator losses at steady state, reducing overall controller power dissipation and improving overall efficiency. Under hiccup conditions, power dissipation in the start-up circuit 600 in FIG. 6, like in the start-up circuits 400, 500 in FIGS. 4 and 5, follows equation (1) for the start-up circuit 100 in FIG. 1 which has a lower power loss than equation (2) for the conventional start-up circuits 200, 300 in FIGS. 2 and 3.

The voltage Vs across capacitor C2 is equal to half of the input voltage Vinput across the terminals Vin+, Vin−. If, for example, the maximum operating voltage at the input pin Vin of the IC controller 601 is 100 V, the highest input voltage across the terminals Vin+, Vin− can reach 200 V.

Assuming that the controller 601 is specified to operate in an N:1 input voltage range (typically about 100 V to about 14 V at the input pin Vin with N=100/14≈7, for example), the start-up circuit 600 in FIG. 6 can operate in the same N:1 range with doubled the maximum (i.e., highest) and minimum (i.e., lowest) input voltages. For example, if N=7 with the maximum specified voltage at the input pin Vin of the controller of about 100 V, then the maximum operating input voltage range of the start-up circuit 600 in FIG. 6 will be about 200 V (i.e., at the highest input voltage) to about 200/7≈28 V (i.e., at the lowest input voltage). Adding one component, buffer 609, doubles the highest input voltage compared to the highest input voltage for the start-up circuit 100 in FIG. 1.

If the highest input voltage across the terminals Vin+, Vin− needs to be more than double the maximum specified voltage at the input pin Vin of the controller 601, then a high-impedance-resistive divider including resistors R3, R4 can be placed across the capacitor C2 to provide a lower voltage Vs as shown in FIG. 6 with dotted lines.

If the highest input voltage across the terminals Vin+, Vin− does not need to be more than double the maximum specified voltage at the input pin Vin of the controller 601, then a high-impedance-resistive divider including resistors R1, R2 or a resistive-capacitive divider can be disposed across the high-side capacitor C1 as shown in FIG. 6 with dotted lines.

To increase noise immunity and improve start-up transients at the input pin Vin, a capacitor C3 can be added between the input pin Vin of the controller 601 and the terminal Vin− without changing basic operation of the start-up circuit 600 in FIG. 6.

Similar to the start-up circuits 400, 500 in FIGS. 4 and 5, by replacing the external start-up circuits in FIGS. 2 and 3 with a less complex, less dissipative and less expensive circuit, the start-up circuit 600 in FIG. 6 does not create power losses at steady state, minimizes power losses under hiccup conditions, allows larger input voltage range for the internal start-up circuit of the IC controller 601, and allows all of the features and characteristics of the IC controller to be fully used. Thus, the start-up circuit 600 in FIG. 6 is suitable for power converters with high input voltage.

The voltage source 608 and buffer 609 are preferably less complex, less dissipative, and less expensive compared to the external start-up circuit 208 in FIG. 2 or the external start-up circuit 300 in FIG. 3. In half-bridge topologies as shown in FIG. 6, the voltage source 608 already exists at the junction of the half bridge capacitors C1, C2 so that no additional components are needed. The buffer 609 can include only a single MOSFET as with the buffer 609 shown in FIG. 6. In addition, a control circuit similar to control circuit 310 in FIG. 3 is not needed.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

What is claimed is:

1. A power converter system comprising:
   first and second input terminals;
   a converter connected to the first and second input terminals and including an output terminal;
   a start-up circuit connected to a first capacitor and configured to charge the first capacitor during start-up and hiccup conditions;
   a voltage source connected to the first and second input terminals and configured to provide, during the start-up and hiccup conditions, a voltage proportional to a voltage applied to the first and second input terminals; and
   a voltage buffer including a MOSFET, the MOSFET including:
      a gate connected to the voltage source;
      a source connected to the start-up circuit; and
      a drain connected to one of the first and second input terminals.

2. A power converter system of claim 1, wherein the voltage source includes a high-impedance resistive divider.

3. A power converter system of claim 2, wherein:
   the high-impedance resistive divider includes first and second resistors connected in series;
   the first resistor is connected to the first input terminal; and
   the second resistor is connected to the second input terminal.

4. A power converter system of claim 3, wherein:
   the high-impedance resistive divider further includes second and third capacitors;
   the second capacitor is connected in parallel with the first resistor; and
   the third capacitor is connected in parallel with the second resistor.

5. A power converter system of claim 1, wherein:
   the converter includes a half-bridge circuit including at least two capacitors connected in series; and
   the voltage source includes the at least two capacitors.

6. A power converter system of claim 1, further comprising a capacitor connected to the output of the voltage buffer.

7. A power converter system of claim 1, wherein the converter includes an auxiliary output.

8. A power converter system of claim 7, wherein the auxiliary output is configured to charge the first capacitor during steady-state conditions.

9. A power converter system of claim 1, further comprising an IC controller configured to provide control signals to the converter after the first capacitor is charged to a predetermined voltage level.

10. A power converter system of claim 9, wherein the IC controller includes the start-up circuit.

11. A power converter system of claim 10, wherein the IC controller includes an input pin that is connected to the start-up circuit and a power-supply pin that is connected to the first capacitor.

12. A power converter system of claim 11, wherein the start-up circuit charges the first capacitor through the power-supply pin.

13. A power converter system of claim 1, wherein the voltage source does not include a Zener diode or a reference voltage.

* * * * *